US005941152A

United States Patent [19]

Kim

[11] Patent Number: 5,941,152

[45] Date of Patent: Aug. 24, 1999

[54] VISE ASSEMBLY FOR CUTTING MACHINE AND FABRICATION METHOD THEREOF

[75] Inventor: Ju Chear Kim, Chungcheongnam-Do, Rep. of Korea

[73] Assignee: LG Industrial Systems Co., Ltd., Seoul, Rep. of Korea

[21] Appl. No.: 08/878,818

[22] Filed: Jun. 19, 1997

[30] Foreign Application Priority Data

Jun. 25, 1996 [KR] Rep. of Korea .................. 1996/23709

[51] Int. Cl.[6] .................................................. B26D 7/02

[52] U.S. Cl. ............................. 83/464; 83/465; 269/181; 269/182; 269/246; 29/283

[58] Field of Search ............................. 83/451, 452, 462, 83/464, 466, 471.3, 581, 467.1, 468.1, 468.2, 468.3, 468.7, 471.2; 269/181, 182, 246; 403/321

[56] References Cited

U.S. PATENT DOCUMENTS

| | | | |
|---|---|---|---|
| 807,273 | 12/1905 | Jirus | 269/181 |
| 1,055,278 | 3/1913 | Hunt | 269/181 |
| 1,243,118 | 10/1917 | Trivigino | 269/181 |
| 1,632,538 | 6/1927 | Brogden | 269/181 |
| 3,273,613 | 9/1966 | Craven, Jr. | 83/464 |
| 3,669,440 | 6/1972 | Kartasuk et al. | 269/181 |
| 4,300,754 | 11/1981 | Lawrence | 269/246 X |
| 4,335,873 | 6/1982 | Kiefer | 269/228 |
| 4,569,510 | 2/1986 | Haramoto | 269/181 |
| 4,653,371 | 3/1987 | Vancalbergh | 83/464 |
| 5,016,510 | 5/1991 | Gardner | 83/471.2 |
| 5,161,443 | 11/1992 | Huang | 83/169 |
| 5,191,821 | 3/1993 | Metzger, Jr. et al. | 83/581 X |
| 5,720,096 | 2/1998 | Dorsey | 83/581 X |

*Primary Examiner*—M. Rachuba

[57] ABSTRACT

A vise assembly and a method of manufacture therefor includes a threaded feed screw rod having a clamp member at one end thereof and a manually graspable handle at the other end thereof. The feed screw rod is rotatably mounted in a vise mount. The vise mount includes a frame mount that includes a pair of laterally extending wing portions and a concave portion between the wing portions in which the feed screw rod is received. On the frame mount are included a pair of stepped frame members, each including a first portion fixed to a respective wing portion of the frame mount, and a second portion bent substantially orthogonal to the first portion thereof to define side portions on either side of the concave portion of the frame mount, the feed screw rod being further disposed therebetween. A vise lock handle is pivotably mounted between the second portions of the pair of stepped frame portions. The vise lock handle includes a concave threaded portion engageable with the threads of the feed screw rod when the vise lock handle is suitably positioned. The frame mount, the stepped frame portions and the vise lock handle are each made from single pieces of material, such as steel, and are bent into shape. This avoids the need for complex, time-consuming, and expensive manufacturing steps, such as die-casting or molding, when the vise assembly is manufactured.

18 Claims, 7 Drawing Sheets

100
42
44
43
30
32
20

VISE ASSEMBLY FOR CUTTING MACHINE AND FABRICATION METHOD THEREOF

BACKGROUND OF THE INVENTION

1. Field of the Invention

The present invention relates to a vise assembly, and more particularly to an improved vise assembly for a cutting machine and fabrication method thereof which makes it possible to decrease the number of work strokes by modifying a structure of the vise assembly, a fabrication method thereof, and material applied thereto, for thereby decreasing production cost.

2. Description of the Related Art

In general, a cutting machine is used to cut an object material by spinning a cutter blade at a high speed, and includes as a peripheral apparatus a clamping devise which clamps the object material and prevents it from swaying during the cutting operation.

A vise assembly denotes a clamping apparatus applicable to a cutting machine, and is provided with a vise mount and a lock handle.

In particular, the vise mount is fabricated so as not to be movable because of the resilience of the object material during a horizontal movement of a feed screw rod, and the vise lock handle for fixing the feed screw rod is also prevented from deformation or otherwise tending breakdown.

This is because the precision of the cutting machine is affected by a how precisely an object material is positioned. As a result, the structure and fabrication method of the vise mount and a vise lock handle still suffers from significant technical problems which have yet to be solved.

FIG. 1 is a front view of a conventional cutting machine. On a base 1 a perpendicular support angle 3 is provided for positioning an object material 2 in an appropriate placement. A vise assembly 4 is mounted opposite the perpendicular support angle 3 on an upper surface of the base 1.

A feed screw rod 5 threaded along its outer periphery is provided threadedly received in the vise assembly 4. At an end portion of the feed screw rod 5, i.e., between the support angle and the vise assembly 4, a clamp 6 is mounted for supporting the object material 2 from an opposite side of the support angle 3. A vise handle 7 is attached to another end of the feed screw rod 5.

FIG. 2 illustrates the structure of the vise assembly shown in FIG. 1, FIG. 3 illustrates the vise mount shown in FIG. 2, and FIG. 4 illustrates the vise lock handle shown in FIG. 2. As shown therein, the vise assembly 4 includes a vise mount 8 fixed onto the base 1 which guides the feed screw rod 5 and horizontal movement of the clamp 6, and a vise lock handle 12 connected by a pin 14 to the vise mount 8 which selectively fixes the feed screw rod 5.

The vise mount 8 is provided with a pin hole 9 in an upper portion thereof. In the middle thereof a insertion opening 10 is formed for receiving the vise lock handle 12 therein. A curved portion 11 is formed in a lower portion of the insertion opening 10 so that the feed screw rod 5 can be placed thereon.

The vise lock handle 12 is provided with a locking portion 13 having a female screw thread which is engaged with a male screw thread, i.e., to the thread of the feed screw rod 5, wherein a pin hole 9' is formed through a portion thereof.

The operational steps and disadvantages of the thusly constituted conventional cutting machine will now be described.

First, when the vise handle 7 is rotated counterclockwise, the feed screw rod 5 is guided by the vise assembly 4, so the clamp 6 moves away from the support angle 3.

When the object material 2 is placed between the support angle 3 and the clamp 6, the vise handle 7 is rotated clockwise, so the clamp 6 moves toward the support angle 3, so that the object material 2 is tightly fixed between the support angle 3 and the clamp 6.

After fixing the vise handle 7, the object material 2 is cut out using an applied power source.

When the cutting operation is completed, the vise handle 7 is rotated counterclockwise so the clamp 6 moves away from the object material 2. Therefore, the object material 2 between the support angle 3 and the clamp 6 can be taken out.

In order to take out the object material 2 without rotating the vise handle 7, the vise lock handle 12 of the vise assembly 4 is gripped and raised upwardly using the pin 14 as a rotation shaft. When the locking portion 13 is there by moved away from the thread of the feed screw rod 5, the vise handle 7 is gripped and the feed screw rod 5 moved axially without rotation to the right as seen in, for example, FIG. 1 so as for the clamp 6 to become spaced from the object material 2, thereby permitting easy removal of the object material 2.

With reference to the above-described operational steps, the vise mount 8 should not be movable because of the resilience of the object material 2, and the vise lock handle 12 should not be deformed or otherwise tend to breakdown.

However, the fabrication of vise lock handle 12 disadvantageously requires die casting, mold sintering, pin-hole forming, female screw forming and the like, thereby increasing work steps.

Further, the vise lock handle 12 formed of a molten foil increases the cost of parts thereof because of an unavoidable surface treatment which is used to prevent the vise lock handle 12 from corroding and becoming rusty.

Still further, the vise mount 8 is fabricated using mold sintering or die casting of a costly aluminum material, followed by forming the pin hole 9 and performing a surface treatment, thereby preventing corrosion and rust from occurring.

That is, because the vise mount 8 and the vise lock handle 12 are manually fabricated, their fabrication takes too much time thereby resulting in deteriorated productivity and price competitiveness.

SUMMARY OF THE INVENTION

Accordingly, it is an object of the present invention to provide a vise assembly for a cutting machine and a method for making such an assembly which makes it possible to decrease work steps by modifying its structure, a fabrication method thereof and a material applied thereto, for thereby decreasing production cost.

To achieve the above-described object, a vise assembly is provided for a cutting machine according to the present invention including a vise mount and a vise lock handle for fixing or guiding a feed screw rod. The vise mount includes a gull wing-shaped frame mount with an insertion recess formed in each wing portion thereof, and a pair of stepped frames having a protrusion formed on each of horizontal flat portions thereof so as to be inserted into a corresponding one of the insertion recesses formed in the frame mount, wherein the frame mount and the stepped frames are formed by bending a steel plate in accordance with a press treatment, and the vise lock handle formed after a saddle and including a pin hole formed in an upper portion thereof, a handle formed on a top end portion thereof, a locking portion formed of a female screw, and a support plate formed at a lower portion of the handle, wherein the vise lock handle is formed by being bent in accordance with a press treatment.

Further, to achieve the above-described object, there is provided a vise assembly fabrication method for a cutting machine according to the present invention which includes the steps of forming on a portion thereof a female screw serving as a locking portion, obtaining a vise lock handle development having the locking portion by appropriately cutting out a steel plate and by forming a pin hole at a portion thereof, forming a handle by bending a support plate of a side portion of the vise lock handle development, obtaining a vise lock handle by upwardly bending each side thereof with the locking portion centered thereat, obtaining a pair of stepped frame developments by appropriately cutting out a steel plate and by forming a protrusion, an engagement hole and a pin hole, obtaining a pair of stepped frames by perpendicularly bending the stepped frame developments, obtaining a frame mount development by appropriately cutting out a steel plate and by forming engagement holes and insertion recesses, obtaining a gull wing shaped frame mount by bending the frame mount development, obtaining a vise mount by aligning the frame protrusion at the insertion recess of the frame mount and applying a press treatment thereto, and combining the vise lock handle to the vise mount using a pin for being inter-activated.

DETAILED DESCRIPTION OF THE INVENTION

Figure 1:
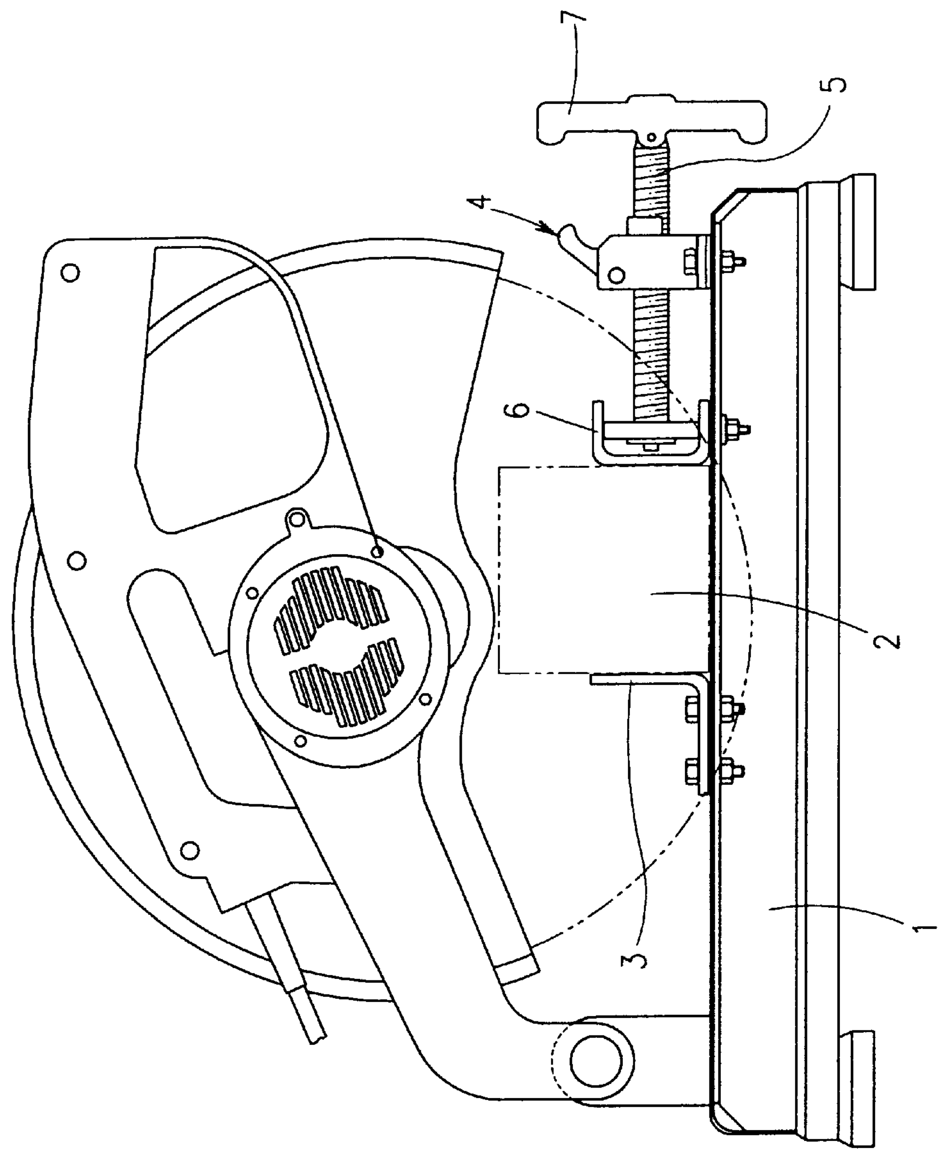
FIG. 1 is a front view of a cutting machine according to the conventional art.
Figure 2:
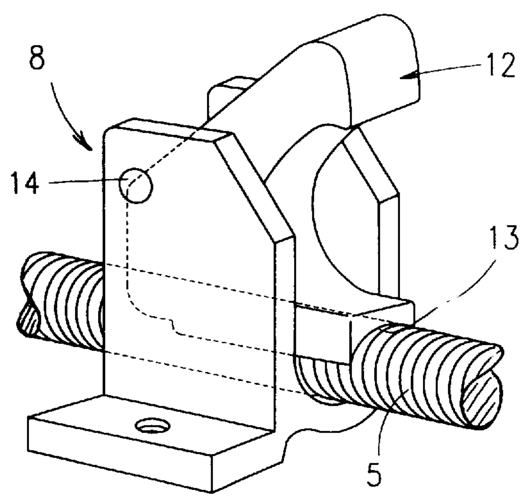
FIG. 2 is a perspective view of a vise assembly as seen in FIG. 1.
Figure 3:
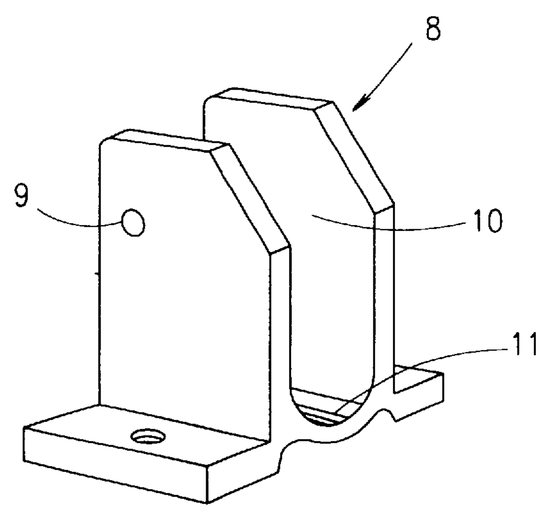
FIG. 3 is a perspective view of a vise mount as seen in FIG. 1.
Figure 4:
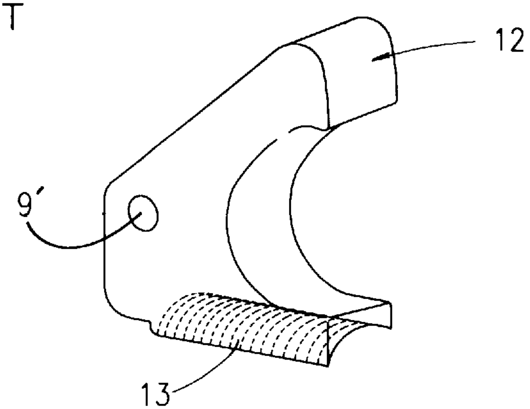
FIG. 4 is a perspective view of a vise lock handle as seen in FIG. 1.
Figure 5A:
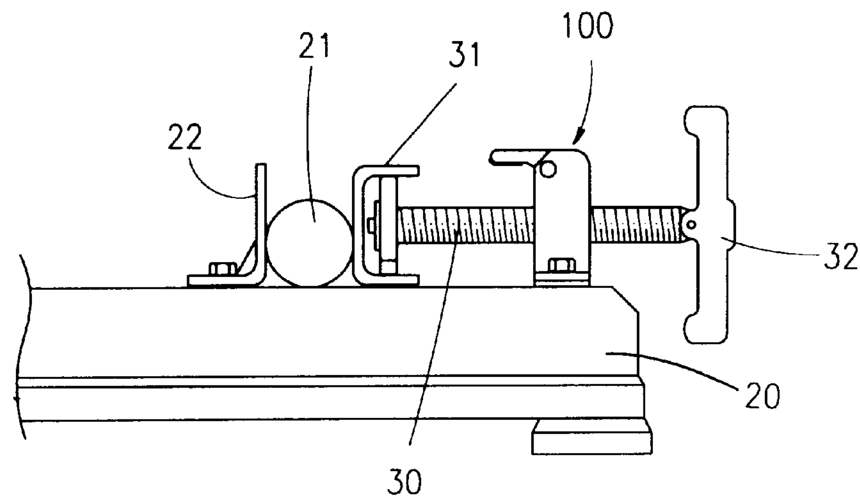
FIG. 5A is a front view of part of a cutting machine according to the present invention.
Figure 5B:
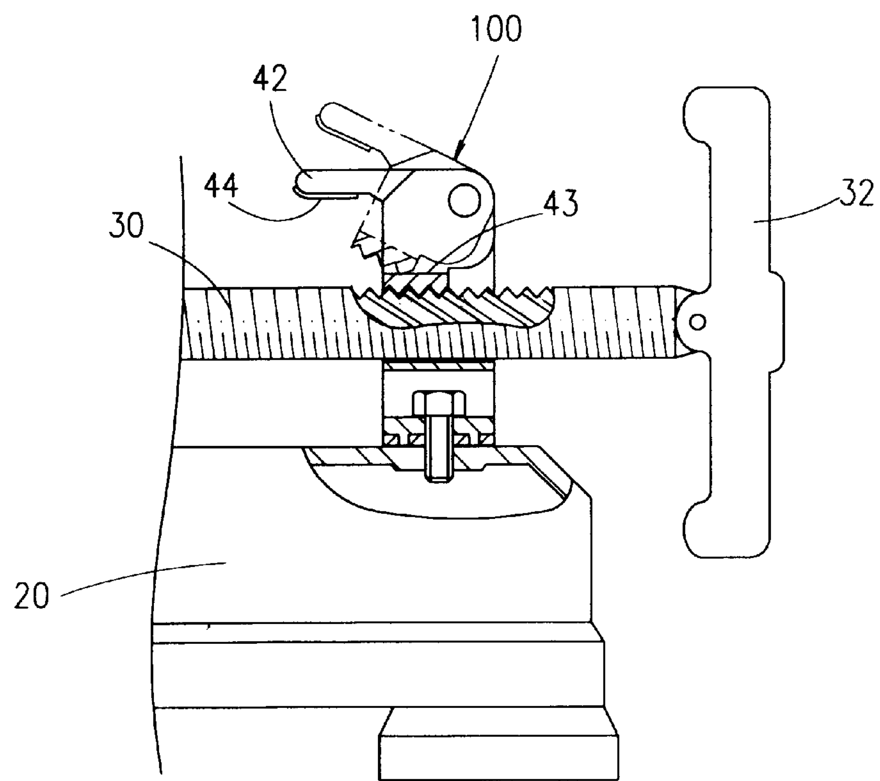
FIG. 5B is a front view illustrating main portions as seen in FIG. 5A.

Reference is made hereinbelow to FIGS. 5A and 5B respectively illustrating a front view and a detailed partial view of a vise assembly according to the present invention. As shown therein, on a base 20 a perpendicular support angle 22 is provided for positioning an object material 21 in an appropriate location. A vise assembly 100 is mounted opposite the perpendicular support angle 22 on an upper surface of the base 20.

A feed screw rod 30 threaded along the outer periphery thereof is provided in and moves with a spiral movement through the vise assembly 100. At an end portion of the feed screw rod 30 between the support angle 22 and the vise assembly 100, a clamp 31 is mounted for supporting the object material 21 from side opposite of the support angle 22. A vise handle 32 is attached to the other end of the feed screw rod 30.

Figure 6:
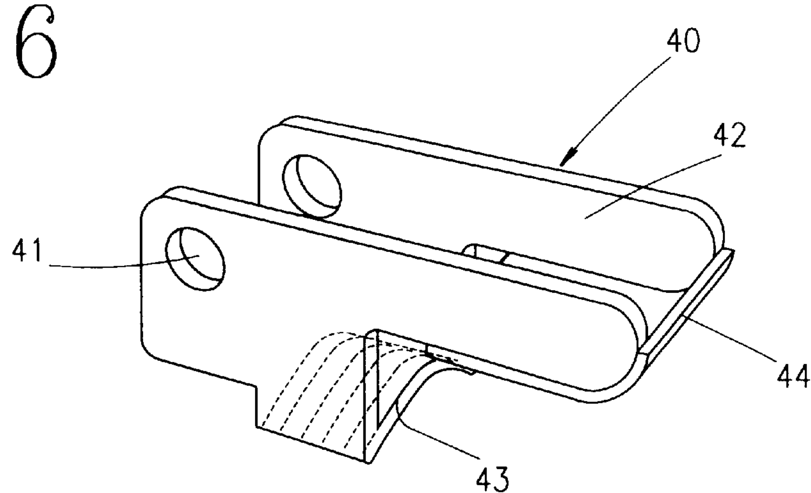
FIG. 6 is a perspective view illustrating a vise lock handle for a cutting machine according to the present invention.

As shown in FIG. 6, vise lock handle 40 has a saddle shape. A pin hole 41 is formed in and through a side portion of the vise lock handle 40. A handle portion 42 protrudes from each side of the vise lock handle 40. The vise lock handle 40 includes a locking portion 43 at a lower portion thereof provided with a female screw thread. A support plate 44 is formed on a lower portion of one of the handle portions 42 thereby facilitating a hand grip.

Figure 7:
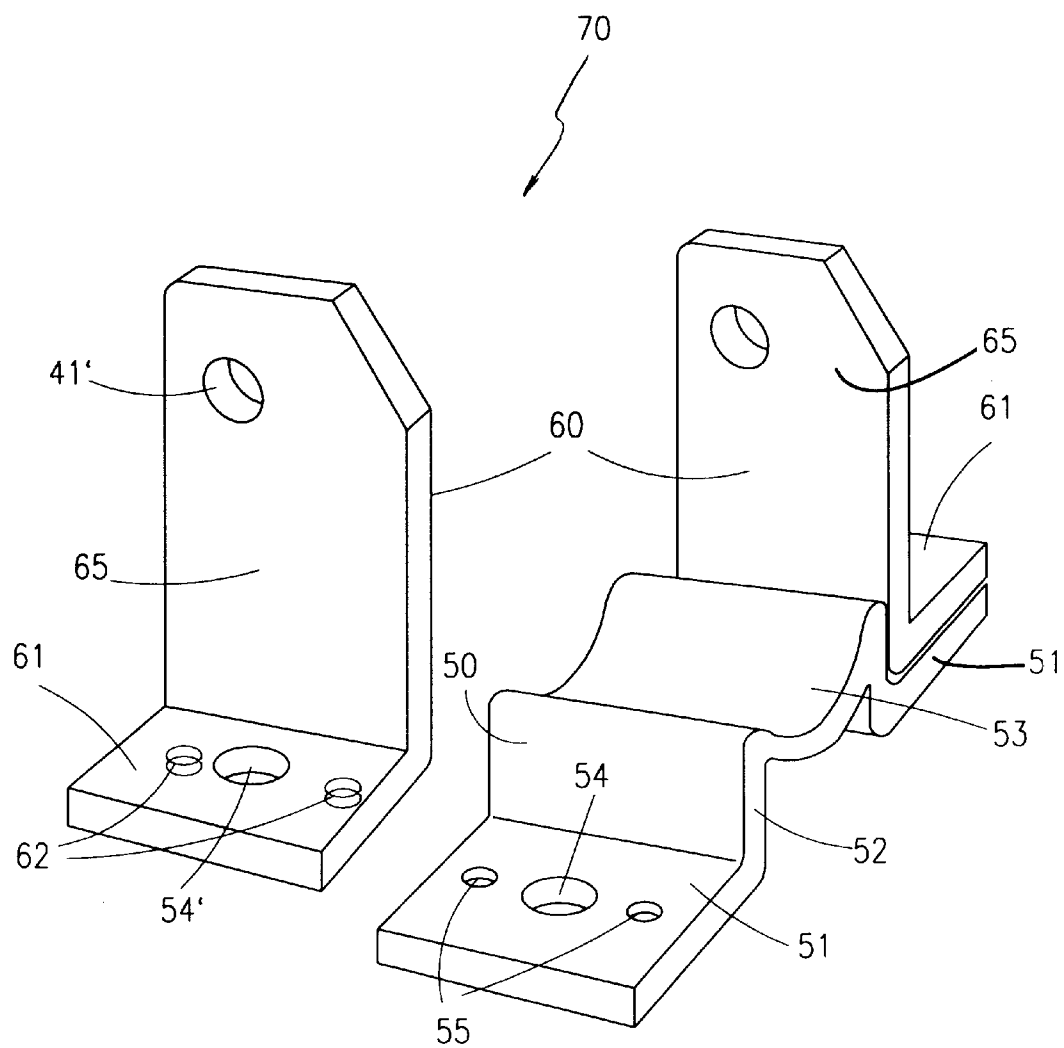
FIG. 7 is a perspective view illustrating a vise mount for a cutting machine according to the present invention.

Referring to FIG. 7, a vise mount 70 is provided with a frame mount 50 and a pair of stepped frames 60.

The frame mount 50 includes a gull wing portion 51 extending outwardly at each side thereof, a vertical portion 52 perpendicular to the gull wing portions 51, and a concave portion 53 connecting the respective vertical portions 52 and sustaining the feed screw rod 30 thereon.

An engagement hole 54 is formed through a central portion of each of the gull wing portions 51, and a pair of insertion recesses 55 are formed on respective sides of the engagement hole 54.

The stepped frames 60 each include a horizontal portion 61 and a vertical portion 65 which are perpendicular to each other, wherein each horizontal portion 61 is formed to correspond in size to the upper surface of the respective gull wing portion 51 of the frame mount 50. Therefore, the horizontal portions 61 are fittingly mounted on the upper surface of each of the gull wing portions 51 of the frame mount 50. In a central portion of the horizontal portions 61 an engagement hole 54' is provided so as to correspond to the engagement hole 54. A pair of protrusions 62 are formed on each side of the lower surface of the horizontal portion 61 of the stepped portion 61 so as to be fittingly inserted into corresponding holes 55 formed in the frame mount 50.

A pin hole 41' is formed through an upper portion of each of the stepped frames 60.

Figure 8:
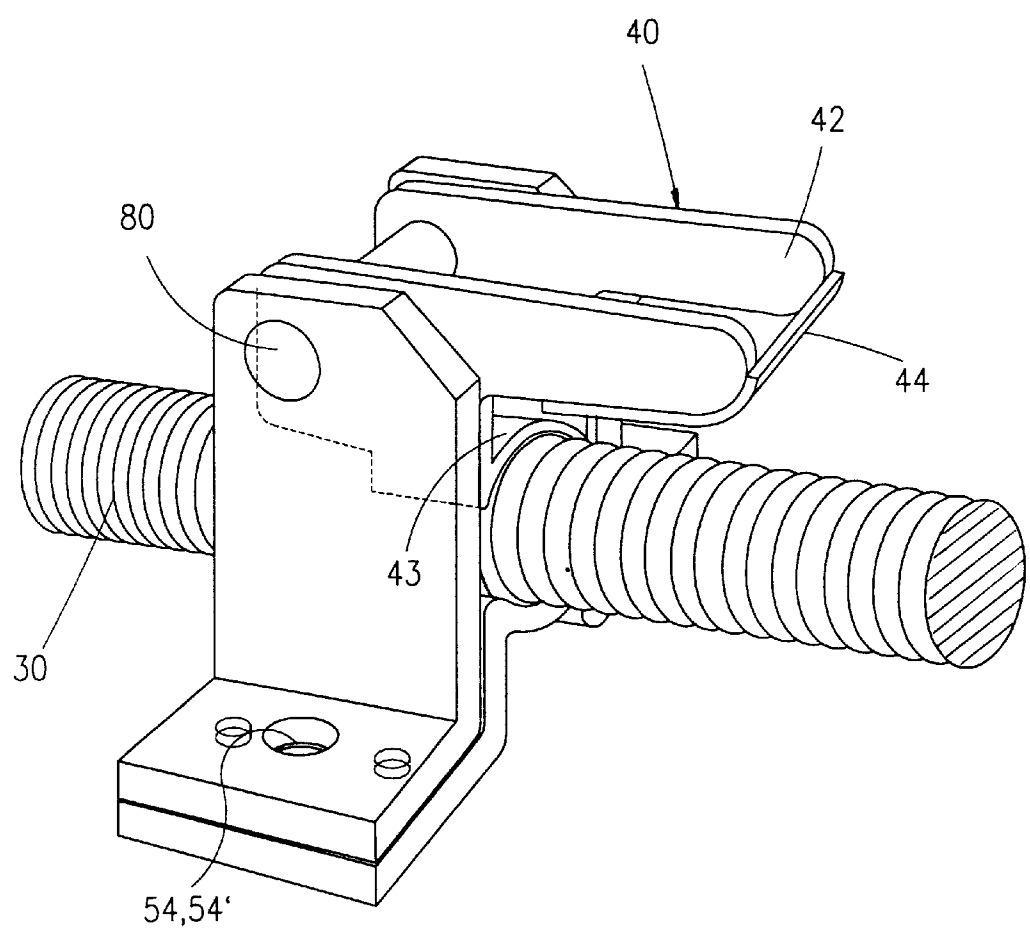
FIG. 8 is a perspective view illustrating a state in which the vise mount as seen in FIG. 7 is assembled with the vise lock handle as seen in FIG. 6.

FIG. 8 is a perspective view illustrating the vise mount 70 assembled with the vise lock handle 40. The feed screw rod 30 is placed on the concave portion 53 of the frame mount 50. Between the pair of stepped frames 60 the vise lock handle 40 is engaged by the pin 80 by way of pin holes 41'.

Figure 9A:
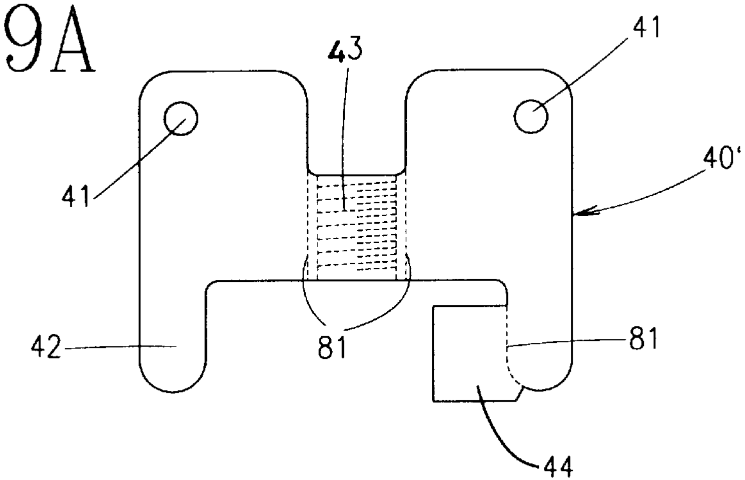
FIG. 9A is a development view illustrating a vise lock handle for a cutting machine according to the present invention.
Figure 9B:
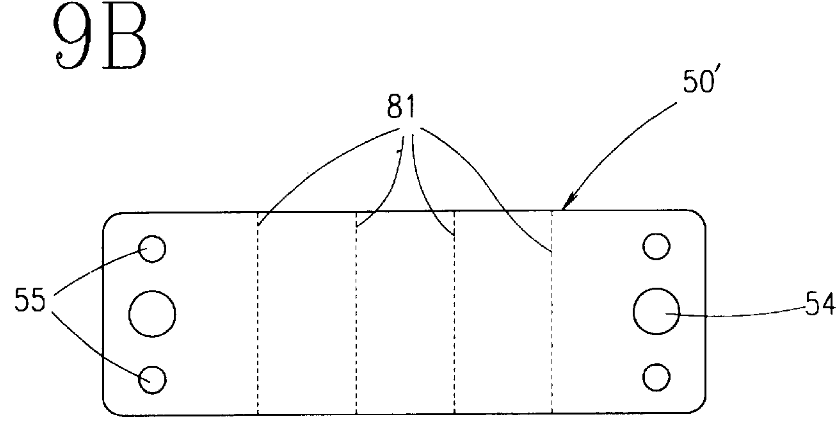
FIG. 9B is a development view illustrating a frame mount of a vise mount for a cutting machine according to the present invention.
Figure 9C:
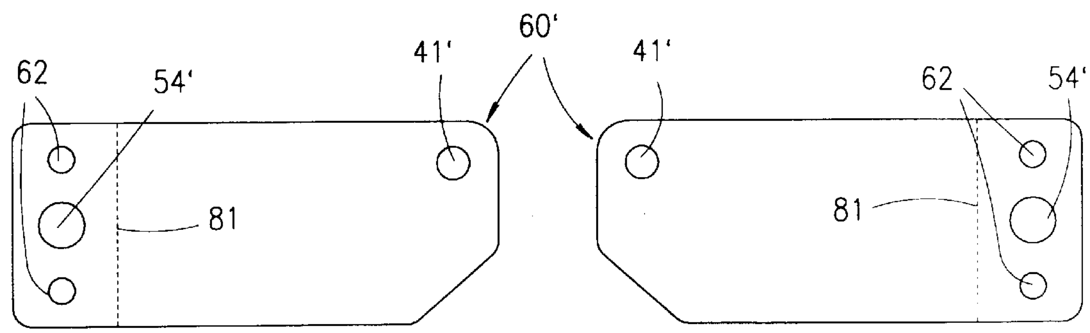
FIG. 9C is a development view illustrating a frame of a vise mount for a cutting machine according to the present invention.

With reference to FIGS. 9A through 9C, a method of fabricating the thusly constituted vise assembly 100 according to the present invention will now be described.

As shown in FIG. 9A, a vise lock handle development 40' includes a locking portion 43 with a female screw thread formed in a lower surface thereof, wherein the locking portion 43 is formed of steel having a high quality stiffness. The stiff steel is appropriately cut out to be formed into the locking portion 43 and at the same time undergoes a press treatment so as to form the pin holes 41 therethrough, thereby completing the vise lock handle development 40'.

The vise lock handle development 40' is upwardly bent along each of the dotted lines 81 in order to form a U-shape, thereby completing the vise lock handle 40.

FIG. 9B illustrates a development of the frame mount of the vise mount according to the present invention. A quality steel plate having a high stiffness is appropriately cut out to form a frame mount development 50' in accordance with an application of a press treatment thereto. Engagement holes 54 and the insertion recesses 55 are then formed. The frame mount development 50' is then appropriately bent thereby completing the gull-wing shaped frame mount 50.

FIG. 9C illustrates a development of pair of stepped frames of the vise mount according to the present invention. As shown therein, a quality steel plate having a high stiffness is appropriately cut out to form a pair of stepped frame developments 60'. Pin holes 41' are formed by a press treatment. A pair of protrusions 62 and an engagement hole 54' between the protrusions 62 are concurrently formed using a press treatment. Then, the pair of stepped frame developments 60' are respectively bent along the dotted lines 81, thereby completing the stepped frame pair 60.

The assembly steps of the thusly provided components according to the present invention will now be described in further detail.

First, the stepped frames 60 are respectively mounted on a corresponding one of the gull wing portions 51 of the frame mount 50, so that the protrusions 62 of the stepped frames 60 are fittingly inserted into corresponding ones of the insertion recesses 55 formed in the gull wing portions 51. The frame mount 50 and the stepped frames 60 undergo a press treatment and the vise mount 70 is completed, accordingly.

The vise lock handle 40 is placed between the stepped frames 60. The pin 80 is inserted through the pin holes 41, 41' of the vise lock handle 40 and the stepped frames 60, thereby completing the vise assembly 100.

Figure 10:
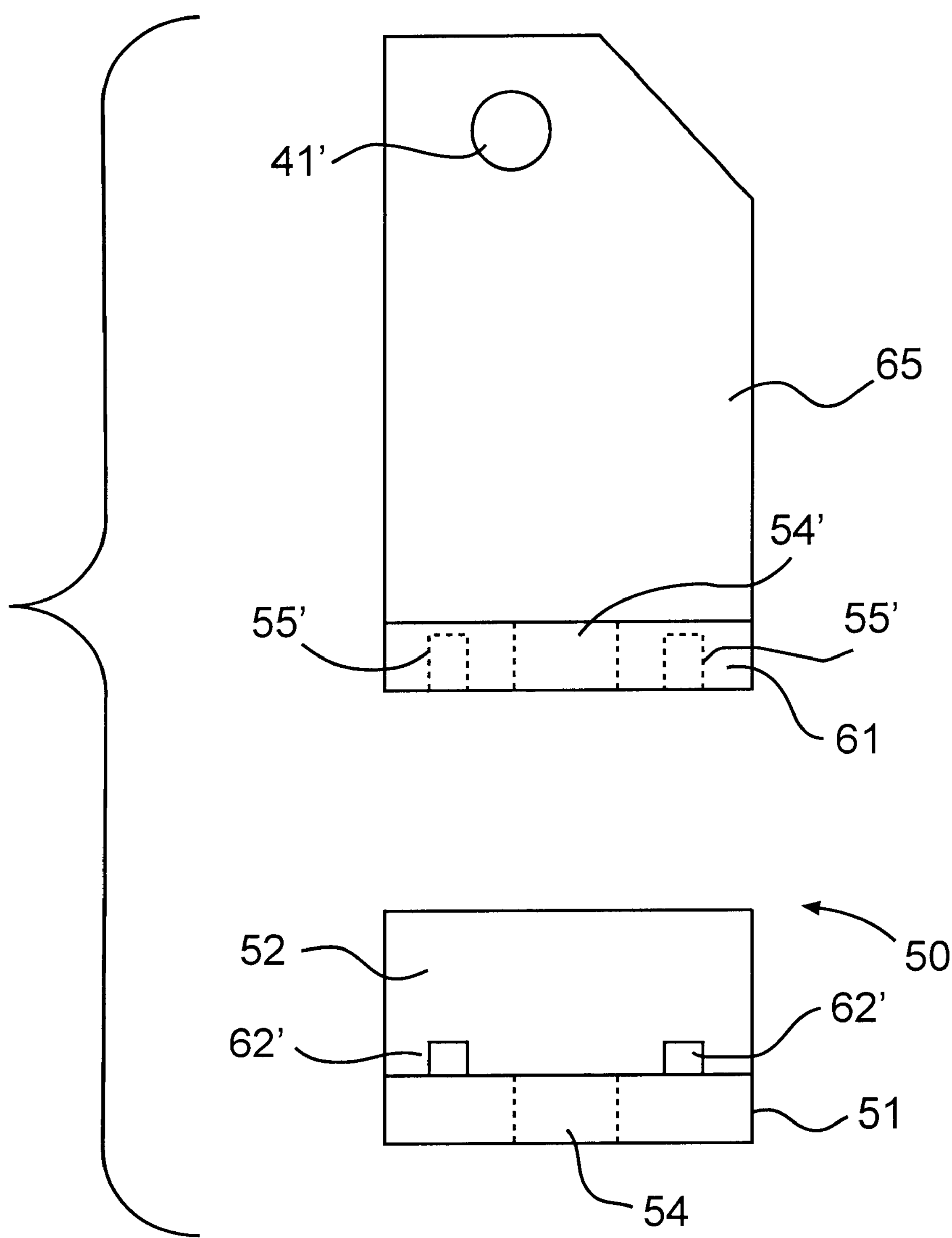
FIG. 10 is an exploded side sectional view of the vise assembly according to the present invention.

FIG. 10 illustrates another arrangement according to the present invention, in which protrusions 62' are provided are provided on respective wing portions 51 and recesses 55' are provided on respective horizonal portions 61 of stepped frames 60.

A cutting operation using the thusly fabricated vise assembly 100 will now be described.

Initially, when the vise handle 32 is rotated counterclockwise, the feed screw rod 30 is guided by the locking portion 43 of the vise lock handle 40 and the concave portion 53 of the frame mount 50, and is moved along in a running direction thereof. Here, the clamp 31 becomes spaced from the support angle 22.

Then, an object material 21 is placed between the support angle 22 and the clamp 31. When the vise handle 32 is rotated clockwise, the clamp 31 is moved toward the support angle 22, and accordingly the object material 21 is tightly fixed between the support angle 22 and the clamp 31.

After fixing the vise handle 32, the object material 21 is appropriately cut out using a conventional power tool.

When the cutting operation is completed, the vise handle 32 is rotated counterclockwise and the object material 21 is released by the clamp 31. At this time the object material 21 can be taken out from between the support angle 22 and the clamp 31.

In order to easily take out the object material 21, without rotating the vise handle 32, the handle 42 of the vise lock handle is gripped, or a finger is hooked up under the handle 42 so as to raise the vise lock handle 42 by using the pin 80 as a rotation shaft thereof. When the locking portion 43 at the lower portion of the vise lock handle 40 is separated from the thread of the feed screw rod 30, the feed screw rod 30 is pulled to the right by gripping the vise handle 32. The clamp 31 therefore becomes spaced from the object material 21, whereby the object material 21 can be easily taken out therefrom.

As described above, the present invention forms respective parts of the vise assembly 100 faster by using a metal press, and a plurality of steps conventionally used to form holes or treat the metal surface conventionally carried out in by die casting or a mold sintering can be omitted, thereby improving productivity.

Further, the present invention has advantages, in that production cost is lowered by replacing use of costly aluminum material with a steel plate having a high stiffness such as SPC-1 or P/O, and the thusly decreased cost reduction serves to increase competitiveness and market share.

Still further, the present invention provides an improvement in fabrication of the vise assembly which is employed to clamp an object material, and reduces work steps during the treatment of the vise assembly, thereby improving productivity.

Also, a cost effective stiff steel is employed to thereby decrease production cost and improve competitiveness.

What is claimed is:

1. A vise assembly comprising:

a threaded feed screw rod including a clamp member mounted at one end thereof and a manually graspable handle mounted at the other end thereof;

a vise mount comprising:

a frame mount made from a first single piece of material and including a pair of laterally extending wing portions adapted for mounting onto a work surface and a first concave intermediate portion between said pair of wing portions shaped to receive said feed screw rod therein; and a pair of stepped frame members each made from respective second single pieces of material, respectively, each said stepped frame member including a first portion parallel with and fixed onto a respective said wing portion and a second portion bent substantially orthogonal to said first portion;

a vise lock handle pivotably mounted between said second portions of said pair of stepped frame members, said vise lock handle being made from a third single piece of material including a pair of laterally outward handle portions and a second concave intermediate portion, said pair of outward handle portions each being bent in the same direction relative to said second concave intermediate portion, said second concave intermediate portion opposing said first concave intermediate portion and being curved in a direction opposite to said first concave intermediate portion of said frame mount, wherein said second concave intermediate portion is threaded so as to be engageable with said threaded feed screw rod, wherein pivoting said vise lock handle moves said threaded second concave intermediate portion into and out of engagement with said threads of said feed screw rod.

2. The assembly according to claim 1, wherein said first single piece of material is steel.

3. The assembly according to claim 1, wherein each said second single piece of material is steel.

4. The assembly according to claim 1, wherein said third single piece of material is steel.

5. The assembly according to claim 1, wherein said first single piece of material, each said second single piece of material, and said third single piece of material are all steel.

6. The assembly according to claim 1, wherein each said wing portion and respective said first portions of said pair of stepped frames fixed thereto include aligned engagement holes whereby said vise mount is fixed onto a work surface.

7. The assembly according to claim 1, wherein said vise lock handle includes a first pin hole formed in each said handle portion and said pair of stepped frames each include a second pin hole formed in said second portion thereof, wherein said vise lock handle is pivotably mounted by way of a pin extending through said first and second pin holes.

8. The assembly according to claim 1, wherein said vise lock handle includes a support plate contiguous with one of said outward handle portions and bent towards the other said outward handle portion so as to span a space between said pair of outward handle portions.

9. A method for manufacturing a vise assembly comprising a threaded feed screw rod, a vise locking handle, and advise mount, the vise mount including a frame mount and a pair of stepped frame portions, the method comprising the steps of:

providing a vise lock handle by:

cutting out a first material portion corresponding to the frame mount, the first material portion including a pair of laterally outward handle portions and an intermediate portion;

bending the intermediate portion so as to be concavely curved and forming a thread pattern therein; and bending the pair of handle portions in the same direction relative to the intermediate portion;

forming a mounting hole in each handle portion such that the mounting holes are coaxially aligned after said step of bending the pair of handle portions;

providing a vise mount by:

cutting out a second material portion including a pair of laterally outward wing portions on opposing sides thereof and an intermediate portion therebetween;

bending the intermediate portion of the second material portion so as to be concavely curved; and bending each wing portion so as to extend laterally outward, thereby obtaining a frame mount;

cutting out a pair of third material portions, each including a first portion sized so as to be fixable relative to a respective wing portion of the frame mount and a second portion;

bending each third material portion so that said first and second portions thereof are substantially orthogonal, thereby obtaining a pair of stepped frames;

forming a mounting hole in each second portion of the stepped frames; and fixing the first portions of the stepped frames to the wing portions of the frame mount such that the mounting holes in the stepped frames are coaxially aligned with each other, thereby obtaining the vise mount;

pivotably mounting the vise lock handle between the stepped frames by aligning the mounting holes of the stepped frames with the mounting holes of the vise lock handle and passing a pin member therethrough; and providing a feed screw rod so that it passes between the concaved portion of the vise mount and the vise lock handle.

10. The method according to claim 9, wherein the first material is a steel plate.

11. The method according to claim 9, wherein the second material is a steel plate.

12. The method according to claim 9, wherein the third material is a steel plate.

13. The method according to claim 9, wherein the first, second, and third materials are steel plate.

14. The method according to claim 10, wherein said step of cutting out the first material portion comprises cutting the metal plate in a metal press.

15. The method according to claim 11, wherein said step of cutting out the second material portion comprises cutting the metal plate in a metal press.

16. The method according to claim 12, wherein said step of cutting the third material portions comprises cutting the metal plate in a metal press.

17. The assembly according to claim 6, wherein one said wing portion is provided with a recess, and one aid first portion corresponding to said one wing portion is provided with a protrusion, wherein said protrusion and said recess are formed relative to said engagement holes formed in said one wing portion and said corresponding first portion so as to align said respective engagement holes when said protrusion and said recess are engaged with one another.

18. The assembly according to claim 6, wherein one said wing portion is provided with a protrusion, and one said first portion corresponding to said one wing portion is provided with a recess, wherein said protrusion and said recess are formed relative to said engagement holes formed in said one wing portion and said corresponding first portion so as to align said respective engagement holes when said protrusion and said recess are engaged with one another.

* * * * *